US012768408B2

(12) United States Patent
Yoon et al.

(10) Patent No.: US 12,768,408 B2
(45) Date of Patent: Oct. 20, 2026

(54) DISK BRAKE APPARATUS OF IN-WHEEL DRIVING SYSTEM

(71) Applicant: HYUNDAI MOBIS CO., LTD., Seoul (KR)

(72) Inventors: Bo Ram Yoon, Yongin-si (KR); Sang Pil Boo, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 1223 days.

(21) Appl. No.: 17/535,321

(22) Filed: Nov. 24, 2021

(65) Prior Publication Data

US 2023/0053858 A1 Feb. 23, 2023

(30) Foreign Application Priority Data

Aug. 17, 2021 (KR) ........................ 10-2021-0107941

(51) Int. Cl.
*F16D 65/00* (2006.01)
*B60B 27/00* (2006.01)
(Continued)

(52) U.S. Cl.
CPC ...... *F16D 65/0056* (2013.01); *B60B 27/0063* (2013.01); *F16D 55/227* (2013.01);
(Continued)

(58) Field of Classification Search
CPC ............... F16D 65/0056; F16D 55/227; F16D 2055/0008; F16D 65/0075;
(Continued)

(56) References Cited

U.S. PATENT DOCUMENTS 5,087,229 A * 2/1992 Hewko ................ B60K 7/0007 475/149
5,180,180 A * 1/1993 Yamashita ............... B60G 3/00 280/93.512
(Continued)

FOREIGN PATENT DOCUMENTS

DE 112005001122 T5 7/2007
DE 112007000241 T5 11/2008
(Continued)

OTHER PUBLICATIONS

Office Action issued on Dec. 5, 2022 in the corresponding German Patent Application No. 102021131600.6.
(Continued)

*Primary Examiner* — Robert A. Siconolfi
*Assistant Examiner* — James K Hsiao
(74) *Attorney, Agent, or Firm* — NovoTechIP International PLLC

(57) ABSTRACT

A disk brake apparatus of an in-wheel driving system may include: an in-wheel driving device having a rotor and stator, and positioned within a wheel; a first torque member installed on the stator, and configured to support one side portions of a pair of brake pads; a second torque member spaced apart from the first torque member, and configured to support the other side portions of the brake pads; and a caliper body having one side portion coupled to the first torque member and the other side portion coupled to the second torque member, and configured to press the brake pads toward a wheel disk.

15 Claims, 15 Drawing Sheets

(51) Int. Cl.

| | |
|---|---|
| ***B60K 7/00*** | (2006.01) |
| ***F16D 55/22*** | (2006.01) |
| ***F16D 55/227*** | (2006.01) |
| *F16D 55/00* | (2006.01) |

(52) U.S. Cl.
CPC ......... *B60B 27/0015* (2013.01); *B60K 7/0007* (2013.01); *B60K 2007/0092* (2013.01); *F16D 2055/0008* (2013.01)

(58) Field of Classification Search
CPC ......... F16D 2055/002; F16D 2250/084; F16D 55/226; B60B 27/0015; B60B 27/063; B60K 2007/0092; B60K 2007/0038; B60T 1/065; H02K 1/12; H02K 1/22; H02K 7/102
See application file for complete search history.

(56) References Cited

U.S. PATENT DOCUMENTS

| | | | | |
|---|---|---|---|---|
| 6,176,352 | B1 * | 1/2001 | Maron | G01L 5/225 188/72.1 |
| 6,565,158 | B2 * | 5/2003 | Seimiya | B60B 3/14 181/207 |
| 7,306,065 | B2 * | 12/2007 | Nagaya | F16F 15/18 280/124.157 |
| 7,556,112 | B2 * | 7/2009 | Suzuki | B60K 7/0007 310/90 |
| 7,624,830 | B1 * | 12/2009 | Williams | B60K 7/0007 180/65.6 |
| 7,938,211 | B2 * | 5/2011 | Yoshino | F16D 51/20 180/65.7 |
| 8,616,314 | B2 * | 12/2013 | Murata | B60B 25/12 301/6.91 |
| 8,887,875 | B2 * | 11/2014 | Gherardi | F16D 55/224 188/72.5 |
| 9,403,429 | B2 * | 8/2016 | Baumgartner | B60K 17/043 |
| 9,457,786 | B2 * | 10/2016 | Baumgartner | G01L 5/28 |
| 10,047,808 | B2 * | 8/2018 | Szewczyk | B60B 25/004 |
| 10,118,479 | B2 * | 11/2018 | Igi | F16D 55/2265 |
| 10,328,788 | B2 * | 6/2019 | Idelevitch | B62D 7/20 |
| 10,532,649 | B2 * | 1/2020 | Arrigoni | B60K 7/0007 |
| 12,090,857 | B2 * | 9/2024 | Saukkio | H02K 11/21 |
| 2004/0099455 | A1 * | 5/2004 | Nagaya | F16F 15/18 180/65.51 |
| 2005/0051390 | A1 * | 3/2005 | Toyoda | F16D 55/228 188/71.1 |
| 2005/0061565 | A1 * | 3/2005 | Mizutani | B60K 17/046 180/65.51 |
| 2007/0096586 | A1 * | 5/2007 | Cros | H02K 1/187 310/67 R |
| 2008/0053719 | A1 * | 3/2008 | Yoshino | F16D 65/12 188/72.1 |
| 2008/0053726 | A1 * | 3/2008 | Marsh | B60K 6/52 180/65.51 |
| 2008/0169141 | A1 * | 7/2008 | Suzuki | H02K 7/085 180/65.7 |
| 2011/0247887 | A1 * | 10/2011 | Murata | B60B 25/12 180/65.51 |
| 2012/0248850 | A1 * | 10/2012 | Hirano | F16D 65/12 301/6.5 |
| 2015/0129327 | A1 * | 5/2015 | Yoshino | B62K 1/00 301/5.23 |
| 2016/0214474 | A1 * | 7/2016 | Igi | B60K 7/0007 |
| 2017/0058975 | A1 * | 3/2017 | Szewczyk | F16D 65/12 |
| 2018/0065469 | A1 * | 3/2018 | Arrigoni | B62M 7/12 |
| 2018/0222549 | A1 * | 8/2018 | Ragland | B62K 11/14 |
| 2019/0002056 | A1 * | 1/2019 | Zhu | H02K 7/006 |
| 2019/0300108 | A1 * | 10/2019 | David | H02K 15/0407 |
| 2022/0314691 | A1 * | 10/2022 | Boo | F16D 65/0087 |
| 2023/0037330 | A1 * | 2/2023 | Yoon | F16D 65/0075 |
| 2023/0241961 | A1 * | 8/2023 | Jiang | B60B 27/0052 301/6.5 |

FOREIGN PATENT DOCUMENTS

| | | | |
|---|---|---|---|
| DE | 112009003757 | T5 | 2/2013 |
| DE | 102016006129 | B3 | 8/2017 |
| JP | 2012025291 | A | 2/2012 |
| JP | 2017-072158 | A | 4/2017 |
| KR | 10-2013-0037873 | A | 4/2013 |
| KR | 10-1682248 | B1 | 12/2016 |

OTHER PUBLICATIONS

Office Action issued on Jan. 17, 2023 in the corresponding Korean Patent Application No. 10-2021-0107941.

Office Action issued on Feb. 4, 2026 in the corresponding Chinese Patent Application No. 202111406897.4.

* cited by examiner

DISK BRAKE APPARATUS OF IN-WHEEL DRIVING SYSTEM

CROSS-REFERENCE TO RELATED APPLICATION

This application claims priority from and the benefit of Korean Patent Application No. 10-2021-0107941, filed on Aug. 17, 2021, which is hereby incorporated by reference for all purposes as if set forth herein.

BACKGROUND

Field

Exemplary embodiments of the present disclosure relate to a disk brake apparatus of an in-wheel driving system, and more particularly, to a disk brake apparatus of an in-wheel driving system, that has a structure in which a driving device configured to provide power for driving a wheel and a braking device configured to press a brake pad against a wheel disk are mounted inside the wheel.

Discussion of the Background

In general, a disk brake apparatus of a vehicle refers to a brake apparatus that generates a braking force by pressing a brake pad against either side of a disk-shaped brake disk rotated with a wheel. Typically, the brake disk has a central portion fixed and mounted onto the center of the wheel by a hub. Thus, the brake apparatus including the brake pad is installed at an outer diameter portion of the brake disk.

The conventional disk brake apparatus is extended from the outer diameter portion of the brake disk toward the inner diameter portion thereof. Thus, the surface pressure between the brake disk (hereafter, referred to as 'disk') and the brake pad (hereafter, referred to as 'friction pad') is more stably applied to the outer diameter portion of the disk than the inner diameter portion of the disk. In other words, the surface pressure applied to the outer diameter portion of the disk is higher than that applied to the inner diameter portion of the disk.

The outer diameter portion of the disk has a higher linear velocity than the inner diameter portion of the disk. Thus, the surface pressure applied to a portion of the friction pad, abutting or adjoining the outer diameter portion of the disk, not only is larger than that applied to a portion of the friction pad, abutting or adjoining the inner diameter portion of the disk, but also acts in a longer distance range than that applied to the portion of the friction pad, abutting or adjoining the inner diameter portion of the disk. Therefore, the outer diameter portion of the disk is worn and heated more than the inner diameter portion of the disk, which makes it difficult to achieve the uniformity of the friction performance while noise is easily generated.

Furthermore, an in-wheel driving system is applied to eco-friendly vehicles such as electric vehicles and hybrid vehicles. Thus, there is a need for the development of a disk brake apparatus which can be efficiently installed in terms of space while avoiding interference with an in-wheel motor, a decelerator and the like, which have various specifications and arrangement structures.

The related art of the present disclosure is disclosed in Korean Patent No. 1682248 registered on Nov. 28, 2016 and entitled "In-Wheel Driving System".

SUMMARY

Various embodiments are directed to a disk brake apparatus of an in-wheel driving system, which can be installed efficiently in terms of space while avoiding interference with other parts in a limited space inside a wheel.

In an embodiment, a disk brake apparatus of an in-wheel driving system may include: an in-wheel driving device having a rotor and stator, and positioned within a wheel; a first torque member installed on the stator, and configured to support one side portions of a pair of brake pads; a second torque member spaced apart from the first torque member, and configured to support the other side portions of the brake pads; and a caliper body having one side portion coupled to the first torque member and the other side portion coupled to the second torque member, and configured to press the brake pads toward a wheel disk.

The first torque member may include: a caliper body coupling part coupled to the caliper body; one or more pad support parts connected to the caliper body, abutting or adjoining the brake pad, and spaced apart from the second torque member; and a stator coupling part connected to the caliper body coupling part or the pad support part, and coupled to the stator.

The caliper body coupling part may have a hole or groove structure at which a guide pin is located, the guide pin serving to movably support the caliper body in an axial direction.

The pad support part may include: a first pad support part connected to one side portion of the caliper body coupling part, and configured to support one of the pair of brake pads; and a second pad support part connected to the other side portion of the caliper body coupling part, and configured to support the other of the pair of brake pads.

The stator coupling part may include: a first stator coupling part coupled to one side portion of the stator; and a second stator coupling part coupled to the other side portion of the stator at a position spaced apart from the first stator coupling part.

The pad support part may include: a first pad support part connected to one side portion of the caliper body coupling part, and configured to support one of the pair of brake pads; and a second pad support part connected to the other side portion of the caliper body coupling part, and configured to support the other of the pair of brake pads. The first stator coupling part may be connected to the first pad support part, and the second stator coupling part may be connected to the second pad support part.

The first and second stator coupling parts may be formed at positions which are not matched with each other, in order to couple different fastening members in the axial direction.

The first and second stator coupling parts may be arranged on the same extension line in the axial direction.

The first and second stator coupling parts may be connected together to one of the plurality of pad support parts.

The first and second torque members may be arranged symmetrically with respect to the brake pad and the caliper body.

The stator may include: a stator body part positioned within the rotor; and a torque member coupling part formed on the stator body part, and coupled to the first torque member.

The torque member coupling part may include: a first torque member coupling part formed at one side portion of the stator body part, and coupled to the first torque member; and a second torque member coupling part formed on the other side portion of the stator body part, and coupled to the second torque member at a position spaced apart from the first torque member coupling part.

The torque member coupling part may include: a protrusion part formed on an inner diameter portion of the stator body part; and a fastening part formed on the protrusion part, such that fastening members for connecting the first torque member to the protrusion part are fastened to the fastening part.

The stator may further include a bracket having one side portion fixed to the stator body part and the other side portion coupled to the first torque member at a position spaced apart from the torque member coupling part.

In accordance with the present disclosure, the disk brake apparatus has a structure in which the brake pad is supported by two torque members corresponding to the first and second torque members. That is, the disk brake apparatus has a structure in which the main beam and the tie bar are omitted, compared to the conventional torque member. Furthermore, the first and second torque member can be coupled and fixed to the stator, not the knuckle, compared to the conventional torque member.

Thus, the disk brake apparatus can avoid the interference with other parts arranged in the central portion of the in-wheel module because it is unnecessary to consider the fastening of the in-wheel module to the knuckle, compared to the conventional structure in which the in-wheel module is fastened to the knuckle by the main beam. Thus, the disk brake apparatus can further improve the degree of freedom in designing the central portion of the in-wheel module. Furthermore, it is possible to remove a lack in layout, which may occur as the internal space of the wheel is further reduced.

Furthermore, since the in-wheel module is assembled to the wheel and the knuckle with the first and second torque members installed and fixed onto the stator, the disk brake apparatus may remove the problem in which the caliper is not fixed but left when the in-wheel module is assembled, thereby further improving the assembling performance and productivity.

Furthermore, in the disk brake apparatus, the portion of the torque member, corresponding to the main beam and the tie bar which occupy ⅔ or more of the weight of the torque member, may be removed, compared to the conventional torque member which is fastened to the knuckle by the main beam. Thus, the weight of the disk brake apparatus can be significantly reduced, which makes it possible to reduce the cost.

The disk brake apparatus may further shorten the radial distance between the portion which supports the braking force of the brake pad and the portion onto which the brake pad is installed and fixed, compared to the conventional torque member fastened to the knuckle by the main beam. Thus, the internal stress applied to the torque member may be further reduced.

DETAILED DESCRIPTION OF THE ILLUSTRATED EMBODIMENTS

Hereinafter, a disk brake apparatus of an in-wheel driving system will be described below with reference to the accompanying drawings through various exemplary embodiments. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
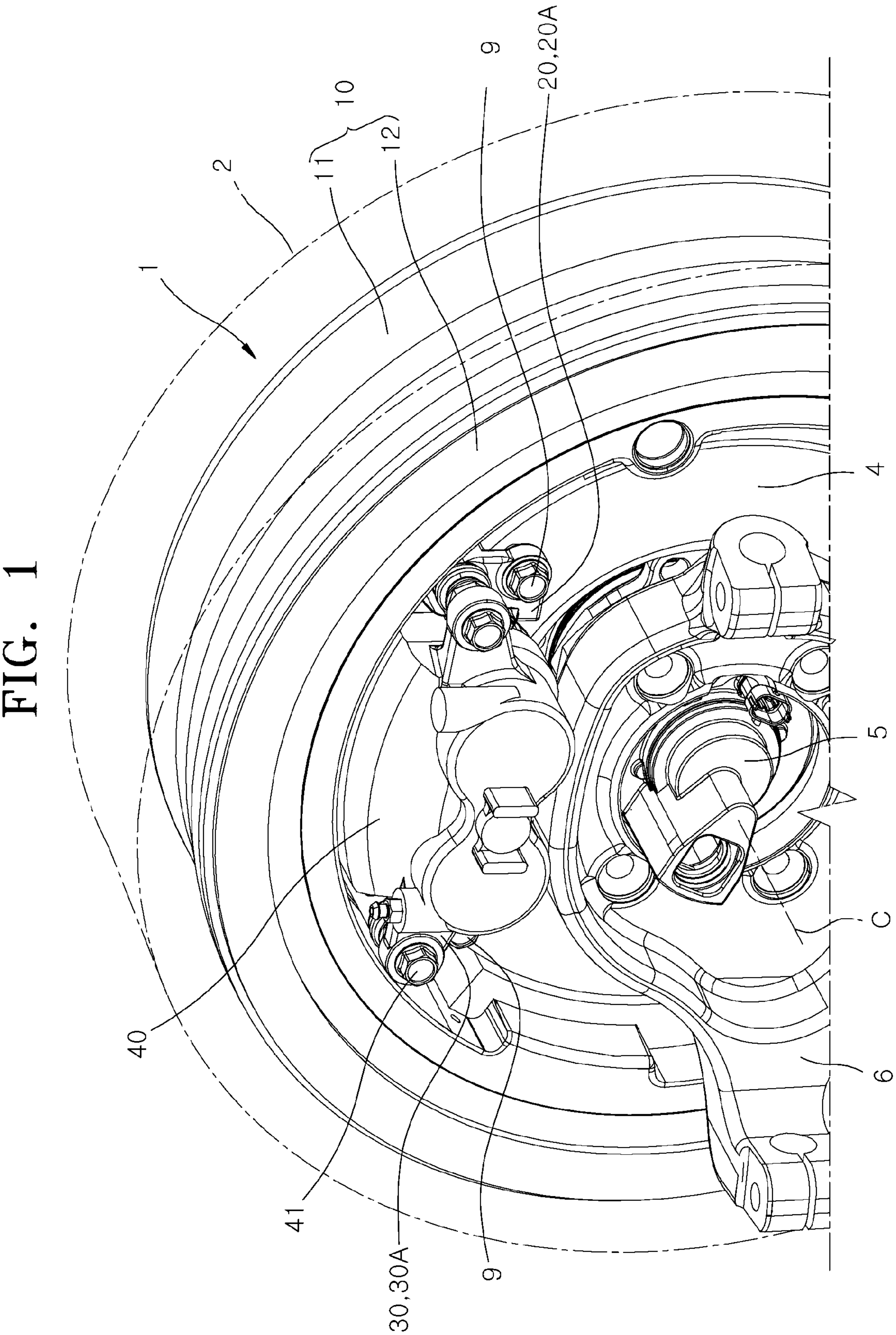
FIG. 1 is a perspective view schematically illustrating an installation state of a disk brake apparatus of an in-wheel driving system in accordance with a first embodiment of the present disclosure.
Figure 2:
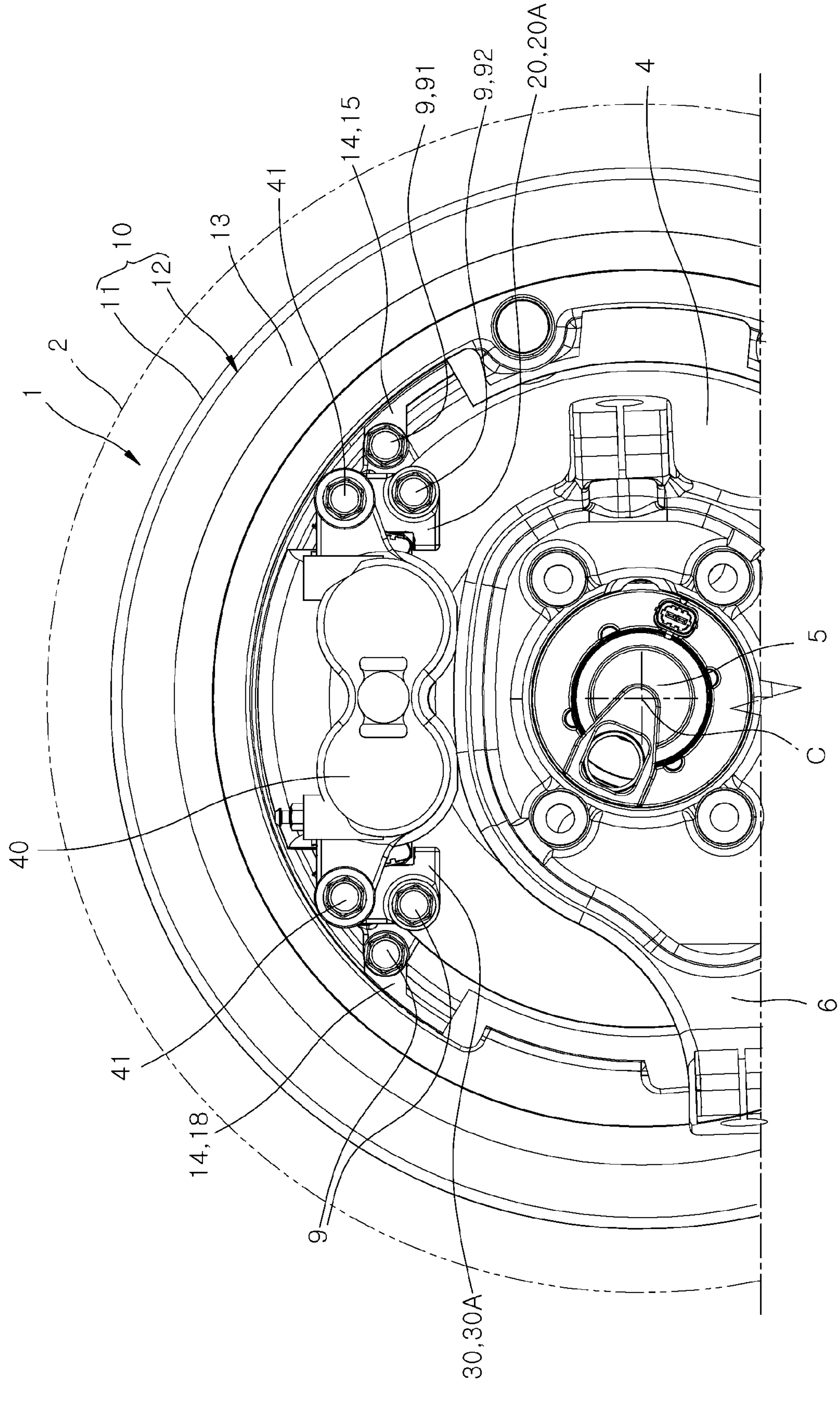
FIG. 2 is a front view of FIG. 1.

FIG. 1 is a perspective view schematically illustrating an installation state of a disk brake apparatus of an in-wheel driving system in accordance with a first embodiment of the present disclosure, and FIG. 2 is a front view of FIG. 1.

Referring to FIGS. 1 and 2, a disk brake apparatus 1 of an in-wheel driving system in accordance with the first embodiment of the present disclosure includes an in-wheel driving device 10, a first torque member 20/20A, a second torque member 30/30A and a caliper body 40, and is positioned within a wheel 2.

The in-wheel driving device 10 includes a rotor 11 and a stator 12, and is disposed to face an inner diameter portion of the wheel 2. In other words, the in-wheel driving device

10 is disposed in the wheel 2 so as to overlap the wheel 2 in a radial direction. The rotor 11 abuts on the inner diameter portion of the wheel 2, and the stator 12 has a hollow cylindrical shape and is positioned within the rotor 11.

The rotor 11 is disposed on the same rotation center axis C as the wheel 2 and rotated with the wheel 2, and the stator 12 is not rotated but maintains a standstill state. Since the rotor 11 is rotated by an electromagnetic interaction with the stator 12 and the structure and action thereof are publicly known, the detailed descriptions thereof will be omitted herein.

The first torque member 20/20A and the second torque member 30/30A are elements to support a brake pad 3 at both sides thereof, respectively, and separated from each other and coupled and fixed to one side portion and the other side portion of the stator 12, respectively. The first torque member 20/20A is coupled and fixed to the one side portion of the stator 12 to support one side portion of the brake pad 3. The second torque member 30/30A is spaced apart from the first torque member 20/20A, and coupled and fixed to the other side portion of the stator 12 so as to support the other side portion of the brake pad 3.

The first torque member 20/20A and the second torque member 30/30A are spaced apart from each other, with the brake pad 3 interposed therebetween. In general, the brake pad 3 has a symmetrical shape in the circumferential direction. The first torque member 20/20A and the second torque member 30/30A are symmetrically formed and arranged in the circumferential direction with respect to the brake pad 3, based on the symmetrical shape of the brake pad 3.

The first torque member 20/20A and the second torque member 30/30A are disposed in a pair of left and right spaces, respectively, which are formed between the stator 12 and both side portions of the caliper body 40 in the circumferential direction (or tangential direction). The circumferential direction is based on a wheel disk 4 having a disk shape.

In the descriptions of the present disclosure, when the relative positions of components are expressed on the basis of the state illustrated in FIGS. 1 and 2, the circumferential direction or tangential direction is also referred to as a side-to-side direction, the radial direction or rotation center direction (reverse radial direction) is also referred to as a top-to-bottom direction, and the axial direction is also referred to as a front-to-rear direction, for convenience of description.

In FIGS. 1 and 2, the first torque member 20/20A is disposed in the space formed between the stator 12 and the right side of the caliper body 40, fixed to the right side portion of the stator 12, and not extended toward the bottom of the caliper body 40, facing the rotation center of the wheel disk 4. The second torque member 30/30A is disposed in the space formed between the stator 12 and the left side of the caliper body 40, located independently of the first torque member 20/20A, fixed to the left side portion of the stator 12, and not extended toward the bottom of the caliper body 40, facing the rotation center of the wheel disk 4.

As such, the first torque member 20/20A and the second torque member 30/30A may be compactly disposed only in the pair of spaces formed between the stator 12 and both side portions of the caliper body 40. Furthermore, the first torque member 20/20A and the second torque member 30/30A are not extended toward the rotation center of the wheel disk 4, i.e. a hub bearing 5 and a knuckle 6. Thus, the first torque member 20/20A and the second torque member 30/30A may be disposed without overlapping or interfering with the hub bearing 5 and the knuckle 6. Therefore, when other parts are disposed in the space between the caliper body 40 and the hub bearing 5 and the knuckle 6 or the sizes, shapes, number, positions and directions of the parts, such as the hub bearing 5 and the knuckle 6, arranged inside the wheel 2, are considered, the degree of freedom in design may be further improved.

The caliper body 40 serves to press the pair of brake pads 3 toward the wheel disk 4, and has one side portion coupled to the first torque member 20/20A and the other side portion coupled to the second torque member 30/30A. The left and right side portions of the caliper body 40 are connected to the first torque member 20/20A and the second torque member 30/30A, respectively, by a guide pin 41 which movably supports the caliper body 40 in the axial direction.

When the assembly process is completed, the pair of brake pads 3 are disposed to face both surfaces of the wheel disk 4 in the axial direction (front-to-rear direction). The left side portions and the right side portions of the brake pad 3 and the caliper body 40 have a symmetrical structure with respect to the middles thereof, such that a friction force can be stably applied to the wheel disk 4 having a disk shape. The first torque member 20/20A and the second torque member 30/30A are disposed symmetrically with each other, on the basis of the middles of the brake pad 3 and the caliper body 40 in the circumferential direction, thereby supporting both side portions of the caliper body 40 in the circumferential direction in a balanced way.

Figure 3:
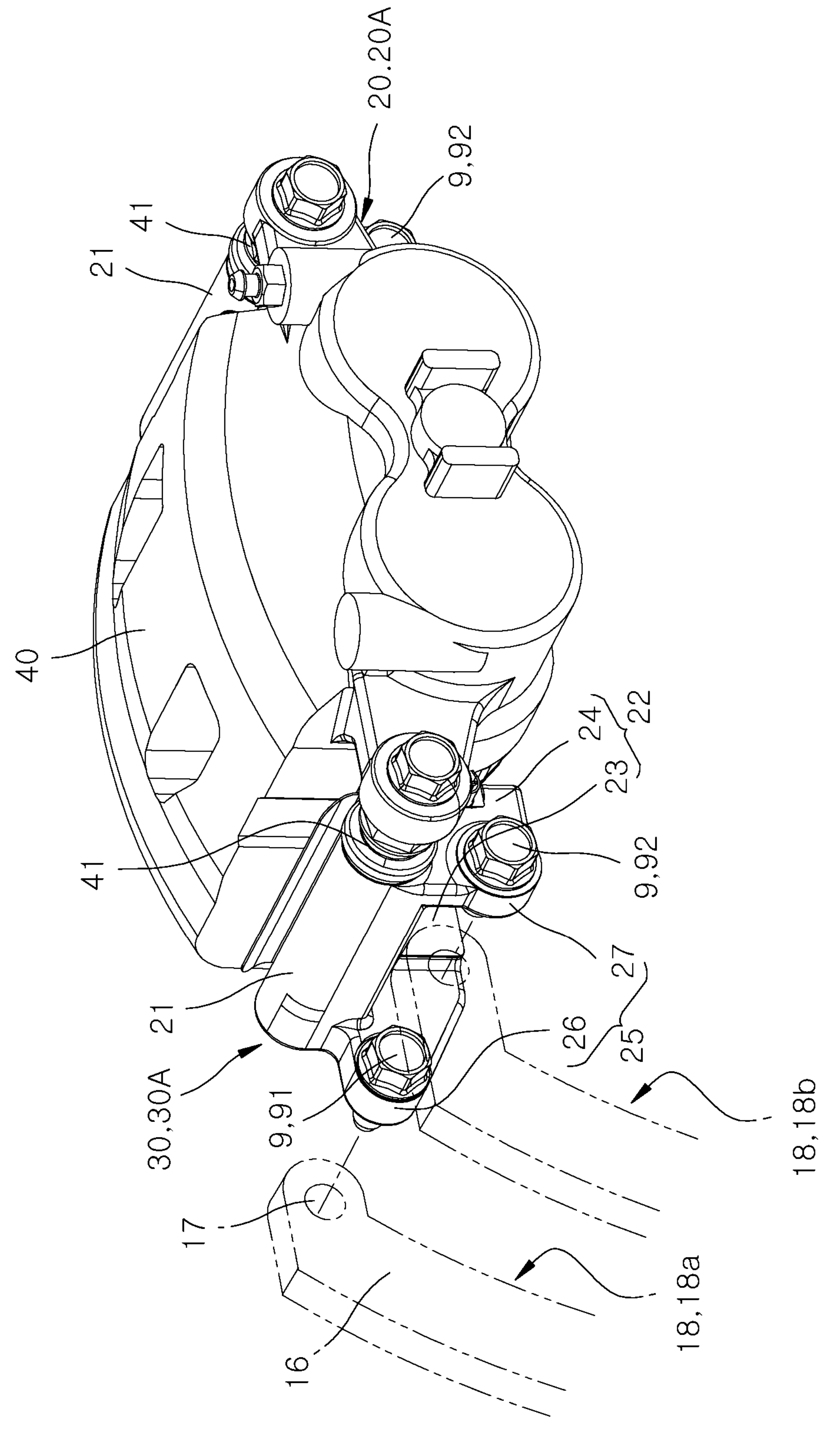
FIG. 3 is a perspective view illustrating main parts of the disk brake apparatus of the in-wheel driving system in accordance with the first embodiment of the present disclosure.
Figure 4:
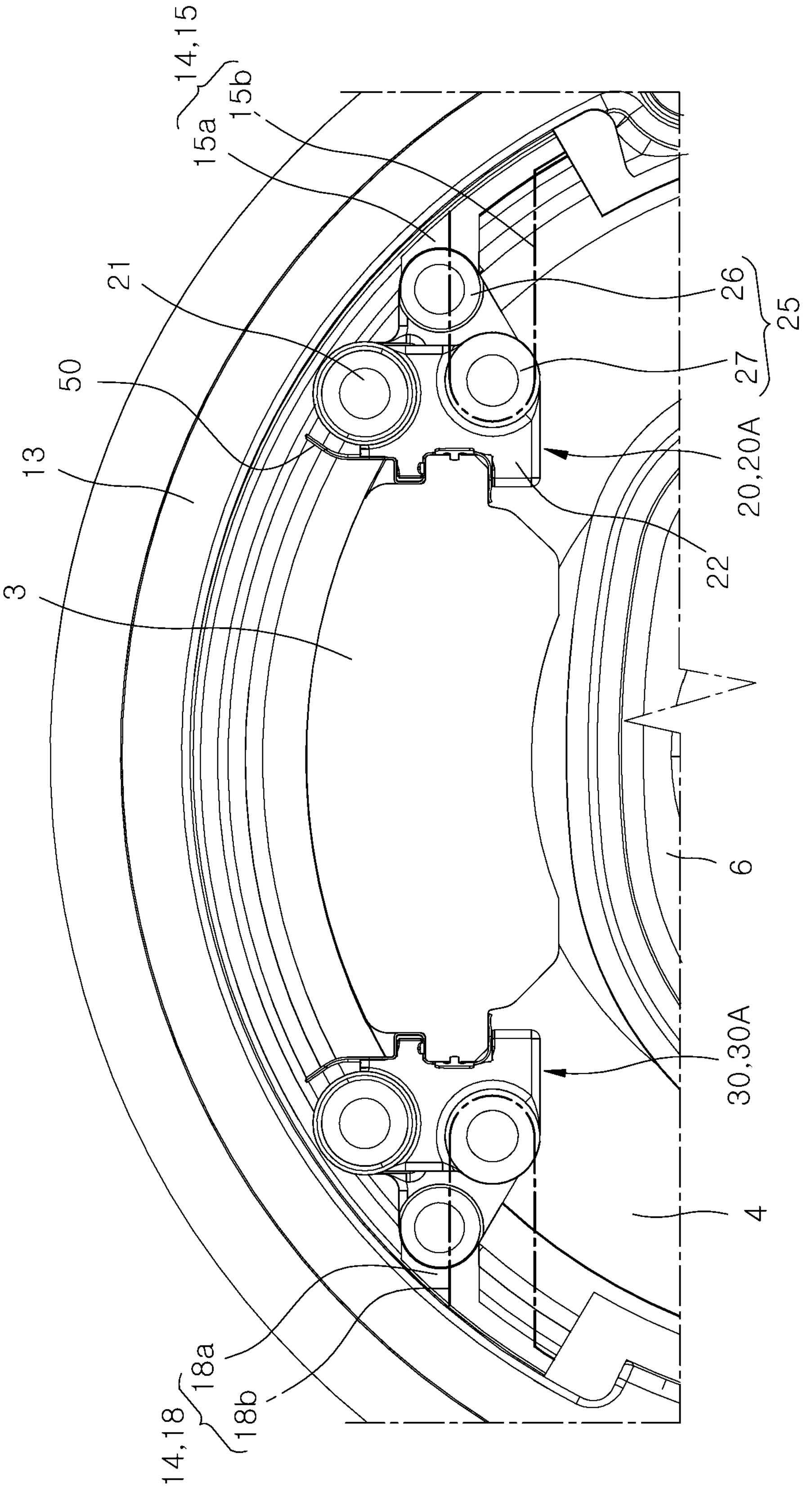
FIG. 4 is a front view illustrating an installation state of the main parts of the disk brake apparatus of the in-wheel driving system in accordance with the first embodiment of the present disclosure.
Figure 5:
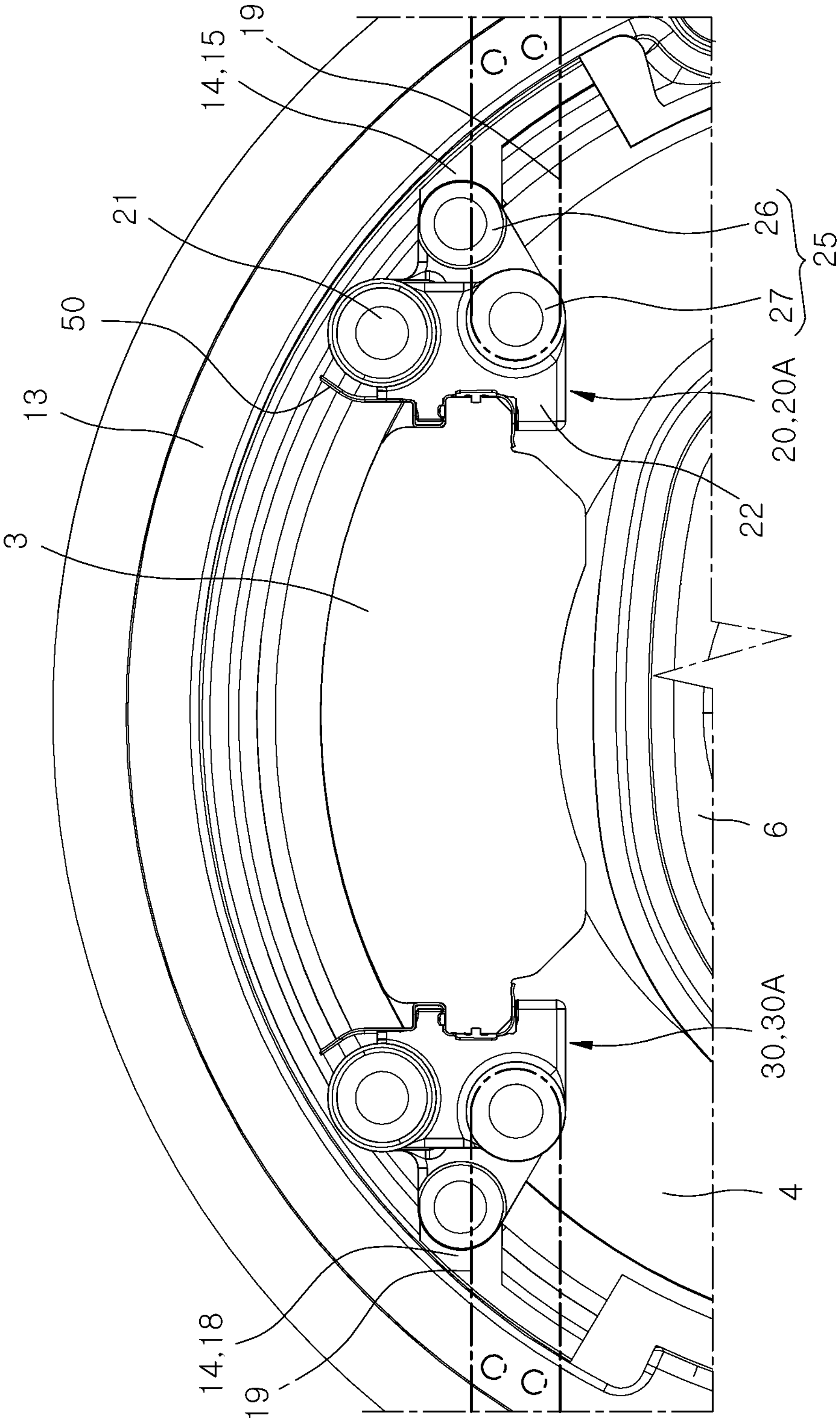
FIG. 5 is a front view illustrating another example of a stator in accordance with the first embodiment of the present disclosure.

FIG. 3 is a perspective view illustrating main parts of the disk brake apparatus of the in-wheel driving system in accordance with the first embodiment of the present disclosure, FIG. 4 is a front view illustrating an installation state of the main parts of the disk brake apparatus of the in-wheel driving system in accordance with the first embodiment of the present disclosure, and FIG. 5 is a front view illustrating another example of the stator in accordance with the first embodiment of the present disclosure.

Referring to FIGS. 3 and 4, the stator 12 in accordance with the first embodiment of the present disclosure includes a stator body part 13 and a torque member coupling part 14.

The stator body part 13 is a part constituting the body of the stator 12, has a hollow cylindrical shape, is positioned within the rotor 11, and serves to rotate the rotor 11 through an electromagnetic interaction with the rotor 11. The torque member coupling part 14 is coupled to the first torque member 20/20A, and formed on the inner diameter portion of the stator body part 13 so as to protrude toward the first torque member 20/20A and the second torque member 30/30A.

The torque member coupling part 14 in accordance with the first embodiment of the present disclosure includes a first torque member coupling part 15 coupled to the first torque member 20/20A and a second torque member coupling part 18 coupled to the second torque member 30/30A at a position spaced apart from the first torque member coupling part 15. More specifically, the first torque member coupling part 15 is formed on one side portion (right side portion) of the stator body part 13, located on one side (right side) of the caliper body 40 in the circumferential direction, and the second torque member coupling part 18 is formed on the other side portion (left side portion) of the stator body part 13, located on the other side (left side) of the caliper body 40 in the circumferential direction.

The first torque member coupling part 15 in accordance with the first embodiment of the present disclosure is provided as a pair of first torque member coupling parts which are coupled to first and second stator coupling parts 26 and 27 of the first torque member 20/20A, respectively, at positions spaced apart from each other in the axial direction. The first and second stator coupling parts 26 and 27 will be described below. Hereafter, the pair of first torque member coupling parts 15 will be represented by 15*a* and 15*b*, for convenience of description, in order to distinguish between the pair of first torque member coupling parts 15.

The inner diameter portion of the stator body part 13 has a depth in the axial direction. One 15*a* of the two first torque member coupling parts 15 is located on one side of the inner diameter portion of the stator body part 13 in the axial direction, i.e. the outside of the vehicle, and the other 15*b* of the two first torque member coupling parts 15 is located on the other side of the inner diameter portion of the stator body part 13 in the axial direction, i.e. the inside of the vehicle.

The first torque member coupling part 15 and the second torque member coupling part 18 have a symmetrical shape and arrangement structure in the circumferential direction. Since the second torque member coupling part 18 has a structure which is symmetrical with and corresponds to the first torque member coupling part 15, the descriptions of the second torque member coupling part 18 (18*a* and 18*b*) will be omitted herein, and replaced with those of the first torque member coupling part 15.

The first torque member coupling part 15 in accordance with the first embodiment of the present disclosure includes a protrusion part 16 and a fastening part 17. The protrusion part 16 serves to support the first torque member 20/20A, and is formed on the inner diameter portion of the stator body part 13 so as to protrude inward toward the first torque member 20/20A. The fastening part 17 is a part to which a fastening member 9 for connecting the first torque member 20/20A to the protrusion part 16 is fastened, and is formed through the protrusion part 16 in the axial direction.

The fastening part 17 has a hole-shaped structure through which the bolt-shaped fastening member 9 can pass. The fastening member 9 having a bolt structure is fastened to the fastening part 17 through the first torque member 20/20A, thereby connecting and fixing the first torque member 20/20A to the fastening part 17. With the first torque member 20/20A fixed to the fastening part 17, a load applied to the first torque member 20/20A is transferred and dispersed to the stator body part 13 through the protrusion part 16.

The first torque member coupling part 15 in accordance with the first embodiment of the present disclosure has a structure including one protrusion part 16 and one fastening part 17, and is provided as a plurality of first torque member coupling parts which individually support the first stator coupling part 26 and the second stator coupling part 27 at different positions in the axial direction. Thus, the plurality of first torque member coupling parts 15 may disperse the load applied to the first and second stator coupling parts 26 and 27 on the basis of the stator body part 13, thereby stably supporting the first and second stator coupling parts 26 and 27.

Referring to FIG. 5, the stator 12 in accordance with the present disclosure may further include a bracket 19, in addition to the stator body part 13 and the torque member coupling part 14.

The bracket 19 serves to mediate the connection between the stator body part 13 and the first torque member 20/20A, and is disposed at a position which does not interfere with the first torque member coupling part 15. One side portion of the bracket 19 has a structure that can be connected and fixed to the stator body part 13, and the other side portion of the bracket 19 has a structure that can be extended toward the first torque member 20/20A and coupled to the first torque member 20/20A (e.g. a structure corresponding to the fastening part 17).

The bracket 19 is not limited to a specific structure and shape as well as publicly known structures and shapes, as long as the bracket 19 can mediate the connection between the cylindrical stator body part 13 and the first torque member 20/20A positioned within the stator body part 13. Thus, the detailed descriptions thereof will be omitted herein. When the bracket 19 is additionally applied, one of the first and second stator coupling parts 26 and 27 of the first torque member 20/20A may be coupled to the first torque member coupling part 15, and the other of the first and second stator coupling parts 26 and 27 may be coupled to the bracket 19.

More specifically, the first stator coupling part 26 may be coupled to the first torque member coupling part 15 protruding from the inner diameter portion of the stator body part 13, and the second stator coupling part 27 may be coupled to the axial end of the stator body part 13 through the bracket 19.

Since the torque member coupling parts 14 protrude from the inner diameter portion of the stator body part 13, the number, positions and thicknesses of the torque member coupling parts 14 may be limited depending on the thickness of the wheel disk 4 or the depth of the stator body part 13 in the axial direction. Furthermore, it may be difficult to arrange the plurality of protrusion parts 16 and fastening parts 17 in the axial direction during the manufacturing and assembling processes. Furthermore, even when the depth of the stator body part 13 in the axial direction is smaller than the distance between the first and second stator coupling parts 26 and 27, it is difficult to apply the plurality of torque member coupling parts 14.

In this case, for example, even when only one torque member coupling part 14 is formed, the bracket 19 may be additionally applied to stably fix and support both of the first and second stator coupling parts 26 and 27 to the stator 12.

Figure 6:
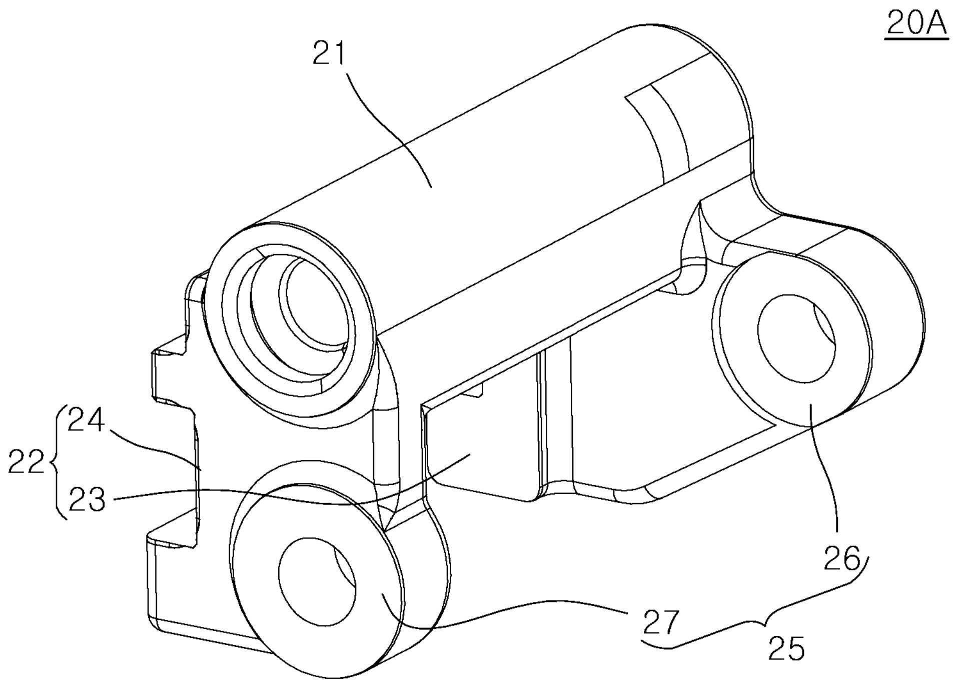
FIG. 6 is a perspective view illustrating a first torque member in accordance with the first embodiment of the present disclosure.
Figure 7:
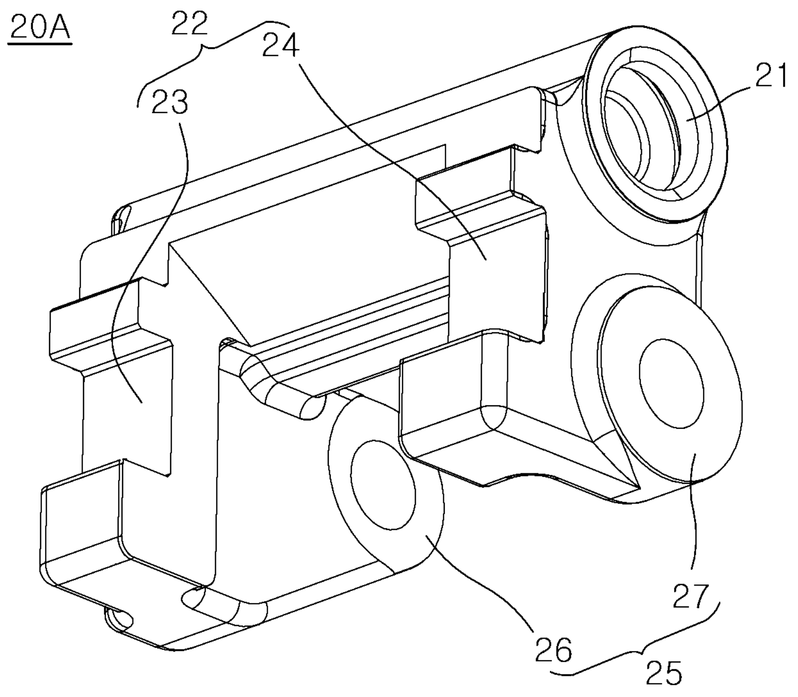
FIG. 7 is a perspective view illustrating the first torque member in accordance with the first embodiment of the present disclosure, when seen from a different direction from FIG. 6.

FIG. 6 is a perspective view illustrating the first torque member in accordance with the first embodiment of the present disclosure, and FIG. 7 is a perspective view illustrating the first torque member in accordance with the first embodiment of the present disclosure, when seen from a different direction from FIG. 6.

The first and second torque members 20 and 30 in accordance with the present disclosure have a symmetrical shape and arrangement structure with respect to the brake pad 3. Since the second torque member 30 has a structure that is symmetrical with and corresponds to the first torque member 20, the descriptions of the second torque member 30 will be omitted herein, and replaced with those of the first torque member 20.

Referring to FIGS. 6 and 7, the first torque member 20/20A in accordance with the first embodiment of the present disclosure has a structure in which a caliper body coupling part 21, a pair of front and rear pad support parts 22, and the pair of front and rear stator coupling parts 25 are connected as one body.

The caliper body coupling part 21 is coupled to the caliper body 40 through the guide pin 41. The guide pin 41 is a pin, bolt or bar-shaped part which movably supports the caliper body 40 in the axial direction. The caliper body coupling part 21 has a hole, groove or hub structure which is extended in the axial direction so as to be coupled to the guide pin 41. One guide pin 41 may be fastened and fixed to the caliper body coupling part 21 through one of the left and right side portions of the caliper body 40.

The pad support parts 22 serve to support the right side portions of the pair of brake pads 3, and are connected to the caliper body coupling part 21 and integrated as one body. The pad support parts 22 in accordance with the first embodiment of the present disclosure include a first pad support part 23 and a second pad support part 24.

The first pad support part 23 is connected as one body to one side portion of the caliper body coupling part 21 in the axial direction, and supports one of the pair of brake pads 3. The second pad support part 24 is connected as one body to the other side portion of the caliper body coupling part 21 in the axial direction, and supports the other of the pair of brake pads 3.

Referring to FIG. 4, the first and second pad support parts 23 and 24 may support and constrain the brake pad 3 at a preset position through pad liners 50. The pad liners 50 serve to elastically connect the brake pad 3 to the first torque member 20/20A and the second torque member 30/30A, respectively, and are symmetrically arranged on both sides of the brake pad 3 in the circumferential direction. The pad liners 50 are installed on the four pad support parts 22 formed on the first torque member 20/20A and the second torque member 30/30A, respectively, and elastically support the pair of brake pads 3.

As the contact portions of the first and second pad support parts 23 and 24 with the brake pads 3 and the pad liners 50, various embodiments may be applied depending on the shape and structure of the brake pad 3. The contact portions are not limited to a specific structure and shape as well as publicly known structures and shapes, as long as the contact portions can support the brake pads 3.

The pad support part 22 may be extended downward toward the right side portion of the brake pad 3 from the caliper body 40, and have a length to support the right side portion of the brake pad 3. That is, the pad support part 22 does no need to be extended below the brake pad 3, for example, between the brake pad 3 and the knuckle 6.

The pad support part 22 is a portion of the first torque member 20/20A, which is located closest to the second torque member 30/30A. As such, the pad support part 22 is not extended below the brake pad 3, and thus clearly separated and spaced apart from the second torque member 30/30A.

The stator coupling part 25 is a part coupled to the stator 12, and is connected as one body to the caliper body coupling part 21 or the pad support part 22. The stator coupling part 25 in accordance with the first embodiment of the present disclosure includes a first stator coupling part 26 and a second stator coupling part 27.

Referring to FIGS. 4 and 5, the first stator coupling part 26 and the second stator coupling part 27 are coupled to the right side portion of the stator 12 at positions spaced part from each other in the axial direction or the front-to-rear direction. The first stator coupling part 26 and the second stator coupling part 27 may be coupled to the pair of first torque member coupling parts 15*a* and 15*b*, respectively, or one first torque member coupling part 15 and the bracket 19, respectively. The first and second stator coupling parts 26 and 27 each have a hole or hub shape through which the bolt-shaped fastening member 9 can pass.

When the first and second stator coupling parts 26 and 27 are arranged at positions corresponding to the plurality of first torque member coupling parts 15, respectively, or arranged at positions corresponding to the first torque member coupling part 15 and the bracket 19, respectively, the first and second stator coupling parts 26 and 27 may be integrated with the caliper body coupling part 21 or the pad support part 22. However, the first and second stator coupling parts 26 and 27 in accordance with the first embodiment of the present disclosure are connected to the first and second pad support parts 23 and 24 and integrated with the first and second pad support parts 23 and 24, respectively.

When the first and second stator coupling parts 26 and 27 are integrated with the first and second pad support parts 23 and 24, respectively, the first and second stator coupling parts 26 and 27 are naturally arranged at positions corresponding to the pair of front and rear brake pads 3, respectively. Therefore, loads applied to the pair of brake pads 3 may be directly and efficiently supported at closer positions than in an embodiment in which the first and second stator coupling parts 26 and 27 are formed at different positions.

Furthermore, when the first pad support part 23 and the first stator coupling part 26 are formed as one body and the second pad support part 24 and the second stator coupling part 27 are formed as one body, a required amount of material can be reduced more significantly than in an embodiment in which the first pad support part 23 and the first stator coupling part 26 are separately connected to the stator body part 13 and the second pad support part 24 and the second stator coupling part 27 are separately connected to the stator body part 13. In this case, it is possible to reduce the weight and cost of a product, and to improve the productivity, stiffness and the convenience of maintenance through structure simplification.

When the first stator coupling part 26 is formed as one body with the first pad support part 23 which supports the right side portion of the brake pad 3, the first stator coupling part 26 may be disposed at the right side portion of the first pad support part 23, facing the stator 12. In such a structure, the entire first torque member 20/20A is located only in the space formed between the stator 12 and the right side of the caliper body 40, which makes it possible to improve the space efficiency more than in an embodiment in which the first stator coupling part 26 is formed at the bottom of the first pad support part 23.

Furthermore, when the first stator coupling part 26 is disposed at the right side portion of the first pad support part 23, it indicates that the first stator coupling part 26 is located on a circumferential line or tangential line closer to the center of the brake pad 3 (or more specifically, the middle of the brake pad 3 in the top-to-bottom direction in FIGS. 4 and 5) than in an embodiment in which the first stator coupling part 26 is formed at the bottom of the first pad support part 23. That is, it indicates that with the brake pad 3 extended in the side-to-side direction, the first stator coupling part 26 is located on the extension line of the brake pad 3 in the side-to-side direction. Therefore, when a braking force is applied to the rotating wheel disk 4, a load applied to the brake pad 3 in the circumferential direction or tangential direction may be supported more stably.

Referring to FIGS. 3 to 5, the first and second stator coupling parts 26 and 27 in accordance with the first embodiment of the present disclosure are disposed at positions which are not matched with each other in at least one of the radial direction and the circumferential direction, such that different fastening members 9, or more specifically, first and second fastening members 91 and 92, can be coupled in the axial direction without interference with each other. For example, an axis of the first stator coupling parts 26 is spaced apart form that of the second stator coupling part 27.

When the first and second stator coupling parts 26 and 27 are arranged on different axial lines, the first and second fastening members 91 and 92 on the different axial lines support one first torque member 20. Thus, the movement or rotation of the first torque member 20 with respect to the stator 12 or the fastening member 9 may be clearly restricted.

Referring to FIG. 4, the first stator coupling part 26 in accordance with the first embodiment of the present disclosure is disposed on the right side of the second stator coupling part 27 and located at a higher level than the second stator coupling part 27. Thus, although the first and second stator coupling parts 26 and 27 are located to correspond to the pair of first torque member coupling parts 15*a* and 15*b*, respectively, in order to assemble the first torque member 20 to the stator 12, the first stator coupling part 26 is not covered by the first torque member coupling part 15*b* located in front of the first stator coupling part 26, but exposed to the outside of the stator 12, when seen from the front in the axial direction by an operator.

Therefore, the operator may couple the first stator coupling part 26 to the first torque member coupling part 15*a* at the rear by using the first fastening member 91 on one side (front side) in the axial direction as well as on both sides in the axial direction, depending on the operation environment or convenience, and then couple the second stator coupling part 27 to the first torque member coupling part 15*b* at the front by using the second fastening member 92.

Figure 8:
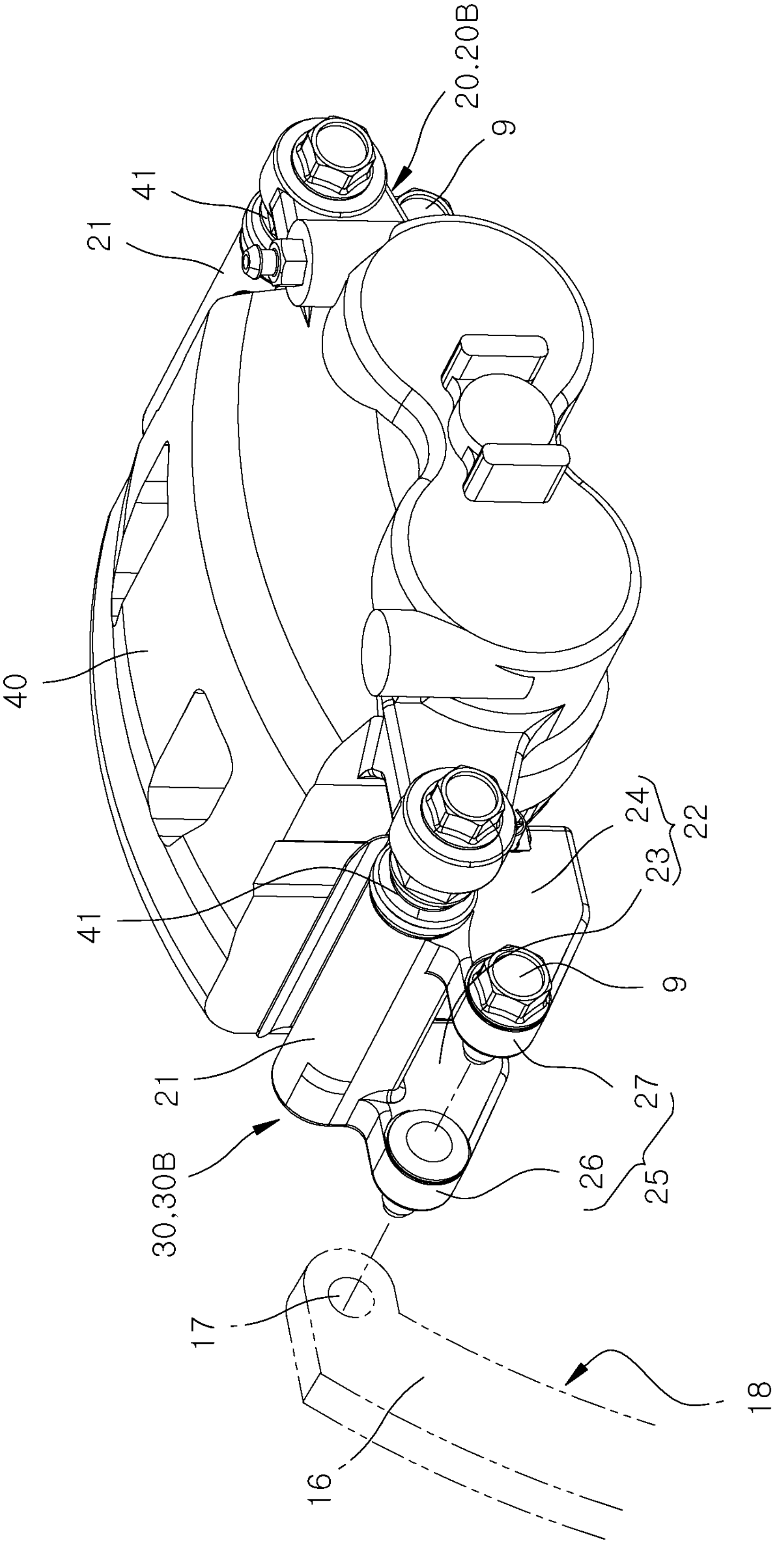
FIG. 8 is a perspective view illustrating main parts of a disk brake apparatus of an in-wheel driving system in accordance with a second embodiment of the present disclosure.

FIG. 8 is a perspective view illustrating main parts of a disk brake apparatus of an in-wheel driving system in accordance with a second embodiment of the present disclosure.

Referring to FIG. 8, a first torque member 20/20B and a second torque member 30/30B in accordance with the second embodiment of the present disclosure have a structure in which the first stator coupling part 26 and the second stator coupling part 27 are arranged coaxially with each other, compared to the first torque member 20A and the second torque member 30A in accordance with the first embodiment of the present disclosure. When the second embodiment of the present disclosure is described, the overlapping descriptions of the same or similar components as or to those of the first embodiment of the present disclosure or components corresponding to those of the first embodiment of the present disclosure will be omitted herein.

When the first and second stator coupling parts 26 and 27 are arranged coaxially with each other, the first stator coupling part 26, the second stator coupling part 27 and the pair of first torque member coupling parts 15*a* and 15*b* may be connected and fastened to one another through one fastening member 9. Thus, compared to the first embodiment of the present disclosure, the process of assembling the first torque member 20/20B and the second torque member 30/30B to the stator 12 may be more simply and rapidly performed.

Figure 9:
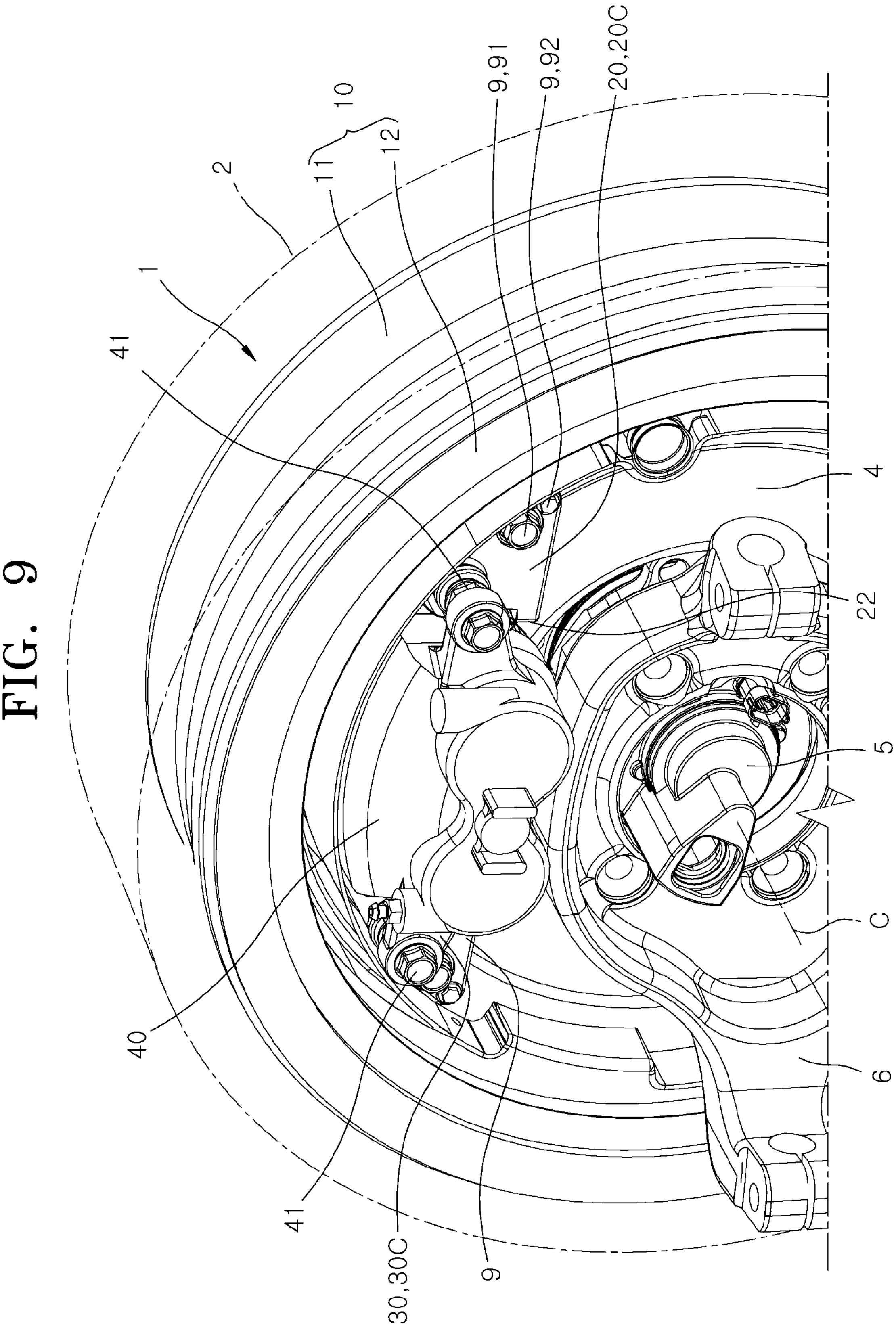
FIG. 9 is a perspective view schematically illustrating an installation state of a disk brake apparatus of an in-wheel driving system in accordance with a third embodiment of the present disclosure.
Figure 10:
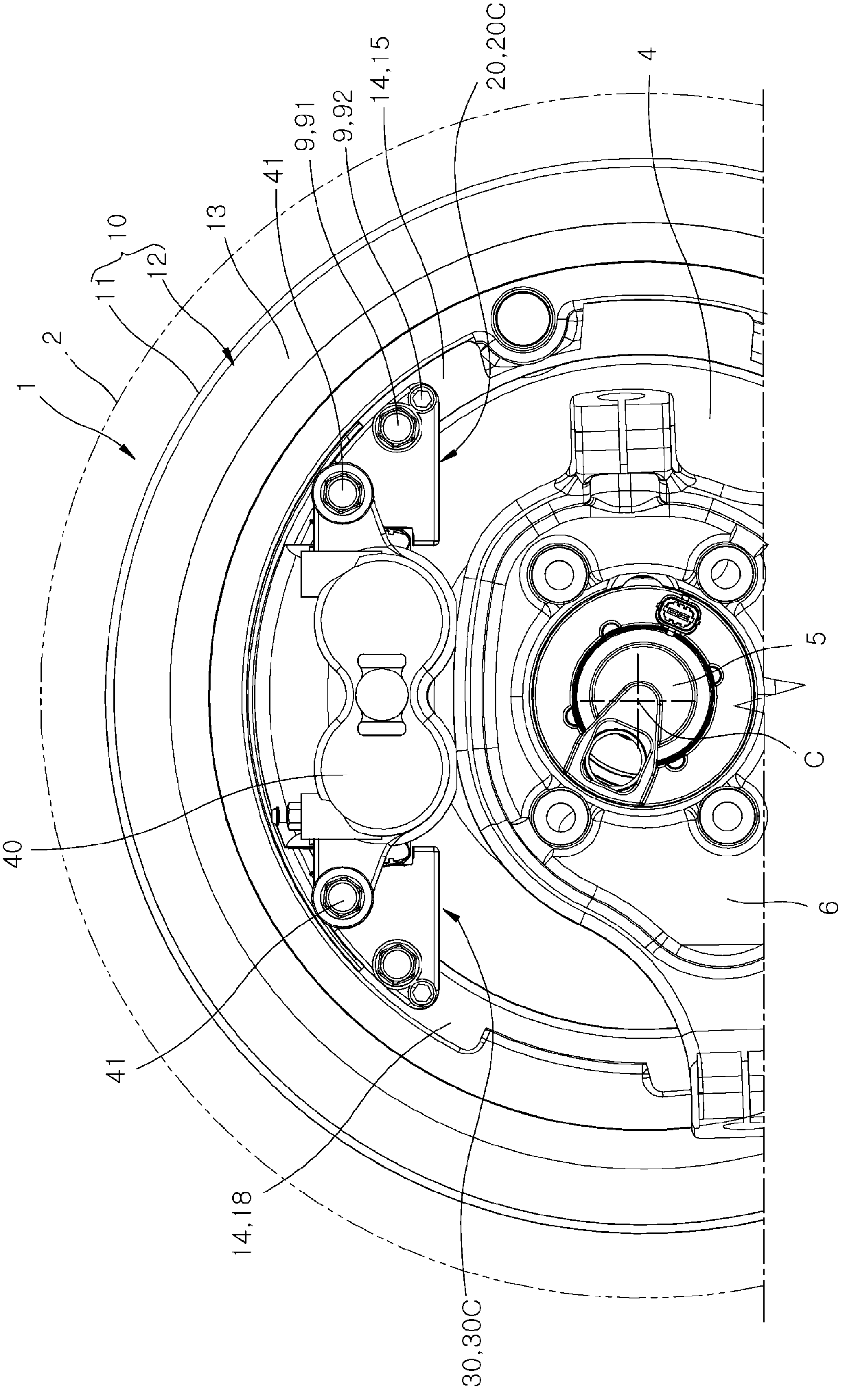
FIG. 10 is a front view of FIG. 9.
Figure 11:
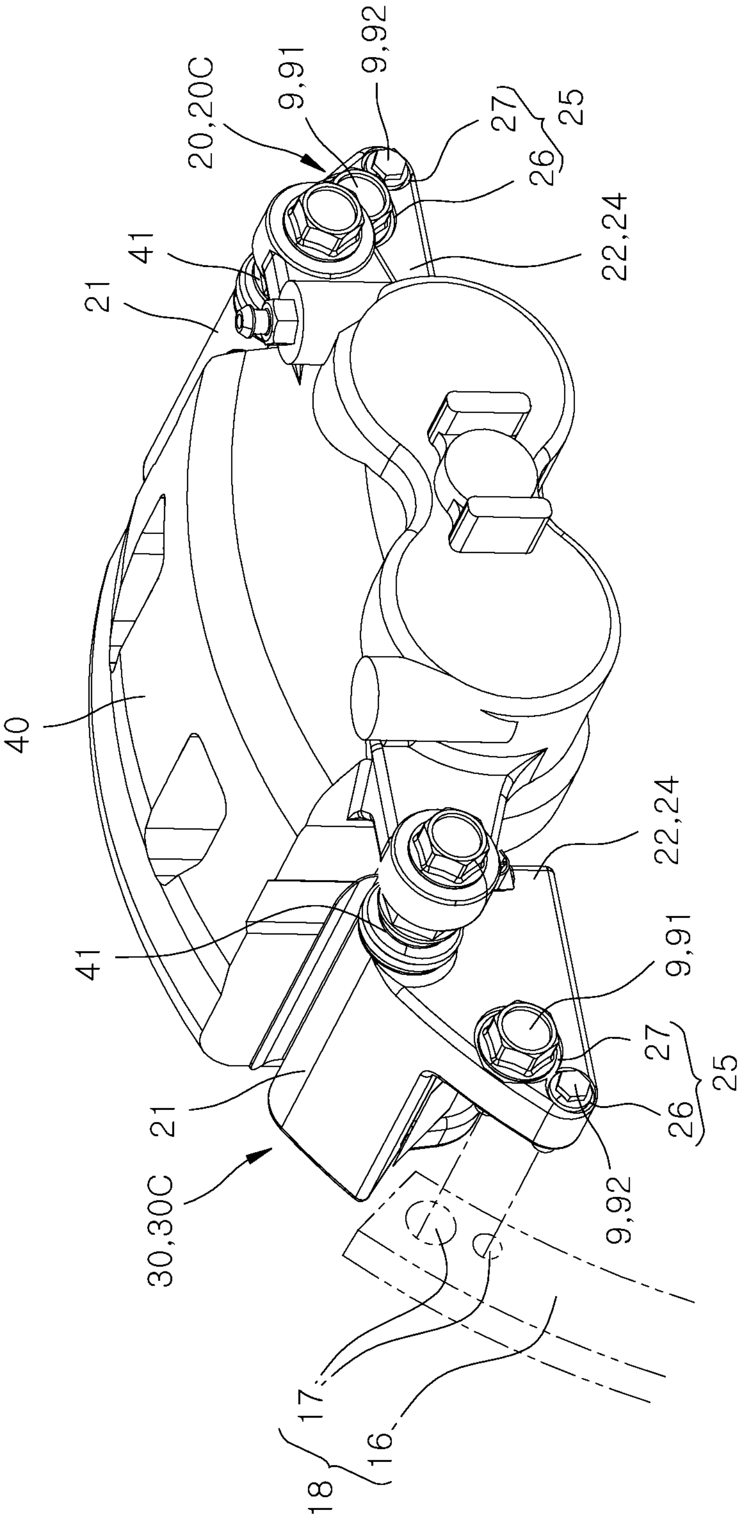
FIG. 11 is a perspective view illustrating main parts of the disk brake apparatus of the in-wheel driving system in accordance with the third embodiment of the present disclosure.

FIG. 9 is a perspective view schematically illustrating an installation state of a disk brake apparatus of an in-wheel driving system in accordance with a third embodiment of the present disclosure, FIG. 10 is a front view of FIG. 9, and FIG. 11 is a perspective view illustrating main parts of the disk brake apparatus of the in-wheel driving system in accordance with the third embodiment of the present disclosure.

Referring to FIGS. 9 to 11, a disk brake apparatus 1 of the in-wheel driving system in accordance with the third embodiment of the present disclosure has a structure in which the first and second stator coupling parts 26 and 27 of a first or second torque member 20/20C or 30/30C are integrated with one of the pair of front and rear pad support parts 22 (e.g. a second pad support part 24), compared to the first embodiment of the present disclosure. When the third embodiment of the present disclosure is described, the overlapping descriptions of the same or similar components as or to those of the first embodiment of the present disclosure or components corresponding to those of the first embodiment of the present disclosure will be omitted herein.

That is, the first and second stator coupling parts 26 and 27 are arranged at the same position in the axial direction. In this connection, the first torque member coupling part 15 of the stator 12 has a structure in which two fastening parts 17 are formed in parallel on one protrusion part 16. The two fastening parts 17 are formed at positions corresponding to the first and second stator coupling parts 26 and 27, respectively, and coupled to the first and second stator coupling parts 26 and 27 by the first and second fastening members 91 and 92, respectively. The second torque member coupling part 18 has the same structure.

Figure 12:
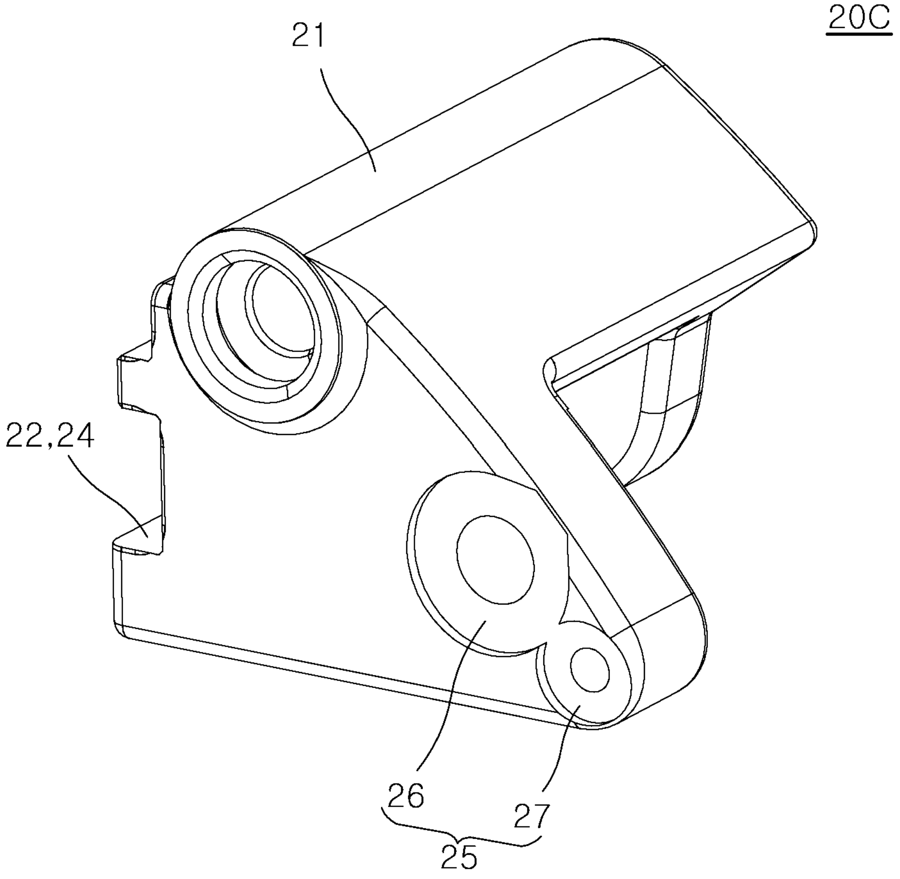
FIG. 12 is a perspective view illustrating a first torque member in accordance with the third embodiment of the present disclosure.
Figure 13:
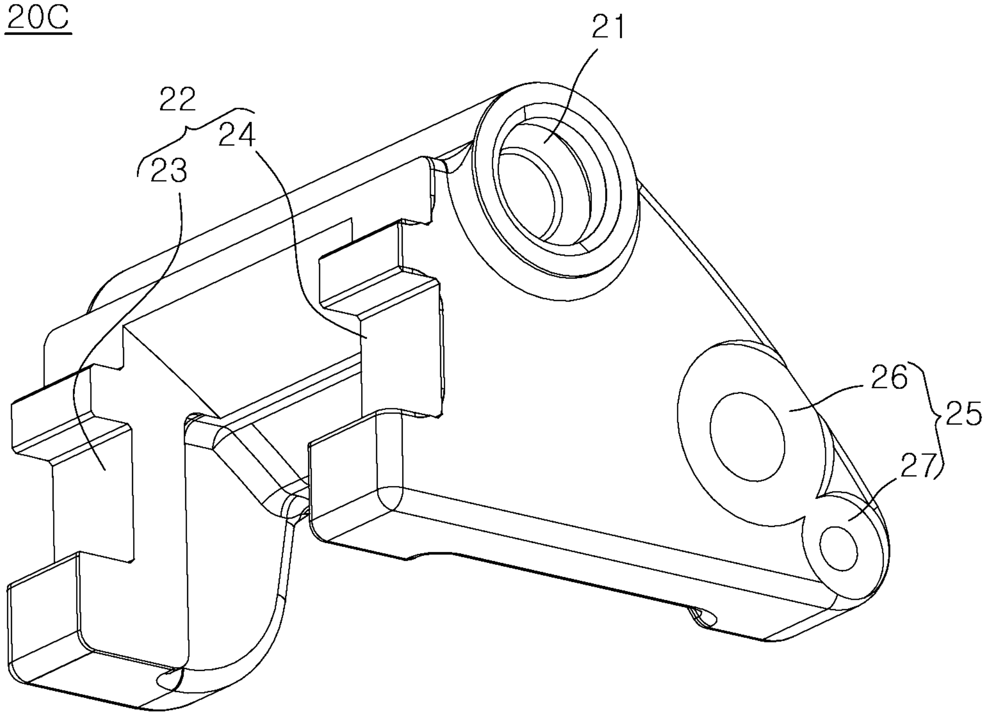
FIG. 13 is a perspective view illustrating the first torque member in accordance with the third embodiment of the present disclosure, when seen from a different direction from FIG. 12.

FIG. 12 is a perspective view illustrating the first torque member in accordance with the third embodiment of the present disclosure, and FIG. 13 is a perspective view illustrating the first torque member in accordance with the third embodiment of the present disclosure, when seen from a different direction from FIG. 12.

Referring to FIGS. 12 and 13, the first torque member 20/20C in accordance with the third embodiment of the present disclosure has a structure in which the caliper body coupling part 21, the pair of front and rear pad support parts 22 and the pair of left and right stator coupling parts 25 are connected as one body. The pair of front and rear pad support parts 22 indicate the first pad support part 23 and the second pad support part 24, and the pair of left and right stator coupling parts 25 indicate the first stator coupling part 26 and the second stator coupling part 27.

The first and second pad support parts 23 and 24 are respectively integrated with one end and the other end of the caliper body coupling part 21 having a groove, hole or hub shape and extended in the axial direction, and the first and second stator coupling parts 26 and 27 are integrated with the right side portion of the second pad support part 24.

The first and second stator coupling parts 26 and 27 may be arranged in the circumferential direction along the inner diameter portion of the stator body part 13. According to such a structure, the second pad support part 24, the first stator coupling part 26 and the second stator coupling part 27 form an arc shape as a whole, when seen from the front as illustrated in FIGS. 10 and 11.

In this connection, the first torque member coupling part 15 has a structure in which two fastening parts 17 are arranged in one protrusion part 16 in the circumferential direction. According to such a structure, one first torque member coupling part 15 may protrude so as to extend in the circumferential direction, thereby supporting the pair of the first stator coupling part 26 and the second stator coupling part 27.

In accordance with the third embodiment of the present disclosure, the first and second stator coupling parts 26 and 27 are formed together on one of the first and second pad support parts 23 and 24, and can be supported together by one first torque member coupling part 15. Therefore, the third embodiment of the present disclosure can be implemented to have a simpler structure than the first embodiment of the present disclosure. Therefore, the simpler structure can improve the productivity and stiffness and the convenience of maintenance.

In accordance with the third embodiment of the present disclosure, when the protrusion extent of the portion of the first torque member coupling part 15, corresponding to the first and second stator coupling parts 26 and 27, i.e. the portion where two fastening parts 17 are formed, is set, the protrusion extent may be reduced enough to fasten the first and second fastening members 91 and 92, which makes it possible to minimize stress applied to the first torque member coupling part 15.

Furthermore, the portion of the first torque member coupling part 15, where the two fastening parts 17 arranged in the circumferential direction are formed, may be located at the same distance from the inner diameter portion of the stator body part 13. Thus, loads applied to the first and second fastening members 91 and 92 may be supported with uniform stiffness, and stably transferred and dispersed to the stator body part 13.

When the first and second stator coupling parts 26 and 27 are integrated with the right side portion of the second pad support part 24, the first and second stator coupling parts 26 and 27 may be arranged not only in the circumferential direction but also in the side-to-side or top-to-bottom direction along the inner diameter portion of the stator body part 13, as described above, and such arrangements may be combined.

When the first and second stator coupling parts 26 and 27 are integrated with the right side portion of the second pad support part 24, the first torque member 20/20C is located only in the extra space formed between the stator 12 and the right side portion of the caliper body 40. Thus, the space efficiency may be improved further than in the embodiment in which the first and second stator coupling parts 26 and 27 are formed at the bottom of the second pad support part 24.

Since the first and second stator coupling parts 26 and 27 are located on a circumferential line or tangential line the same as or closer to the central portion of the brake pad 3, it is possible to more stably support a load applied to the brake pad 3 in the circumferential direction or tangential direction.

Figure 14:
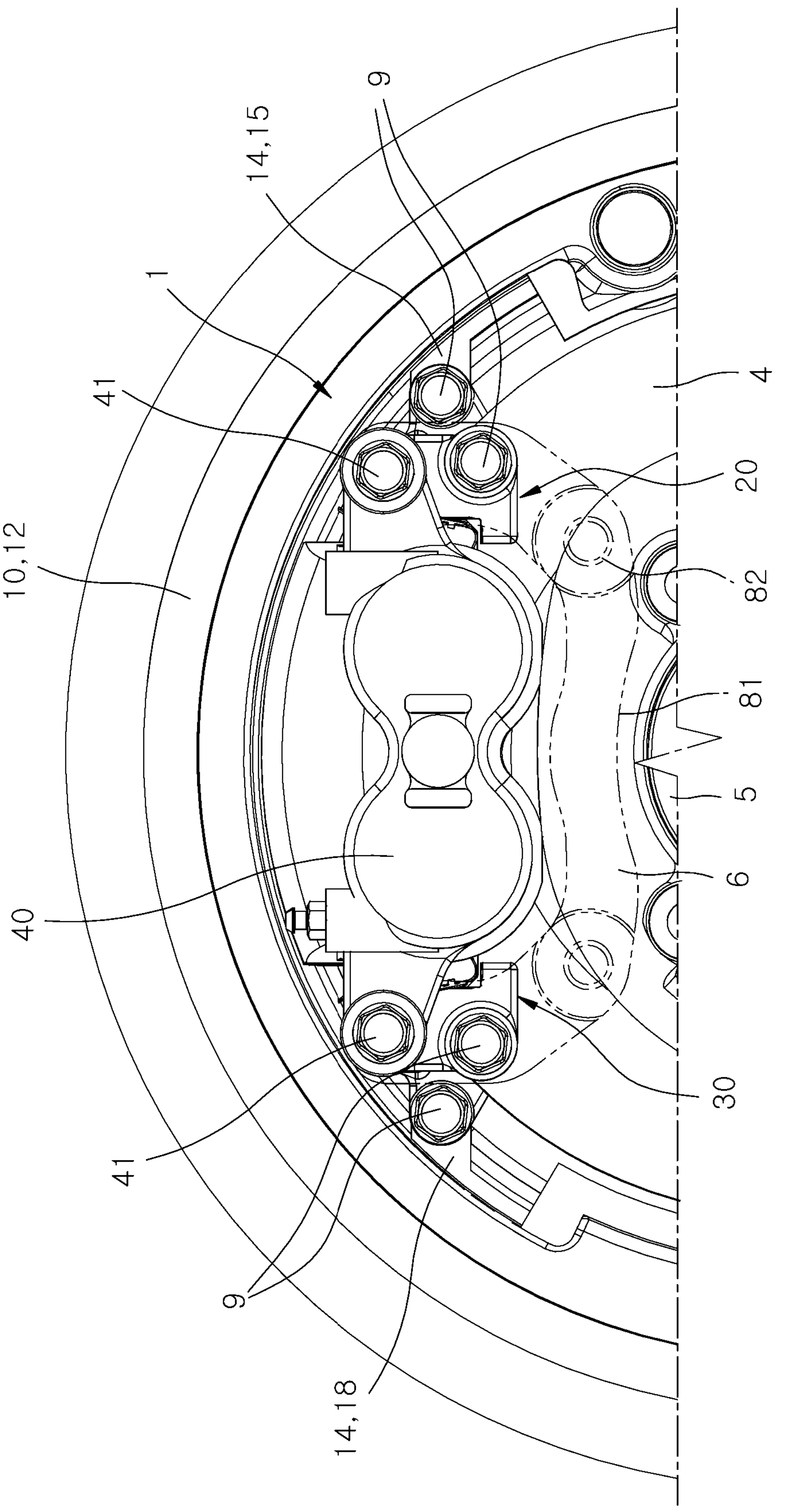
FIG. 14 is a conceptual view for describing the avoidance of interference with other parts when the disk brake apparatus of the in-wheel driving system in accordance with the embodiment of the present disclosure is applied.
Figure 15:
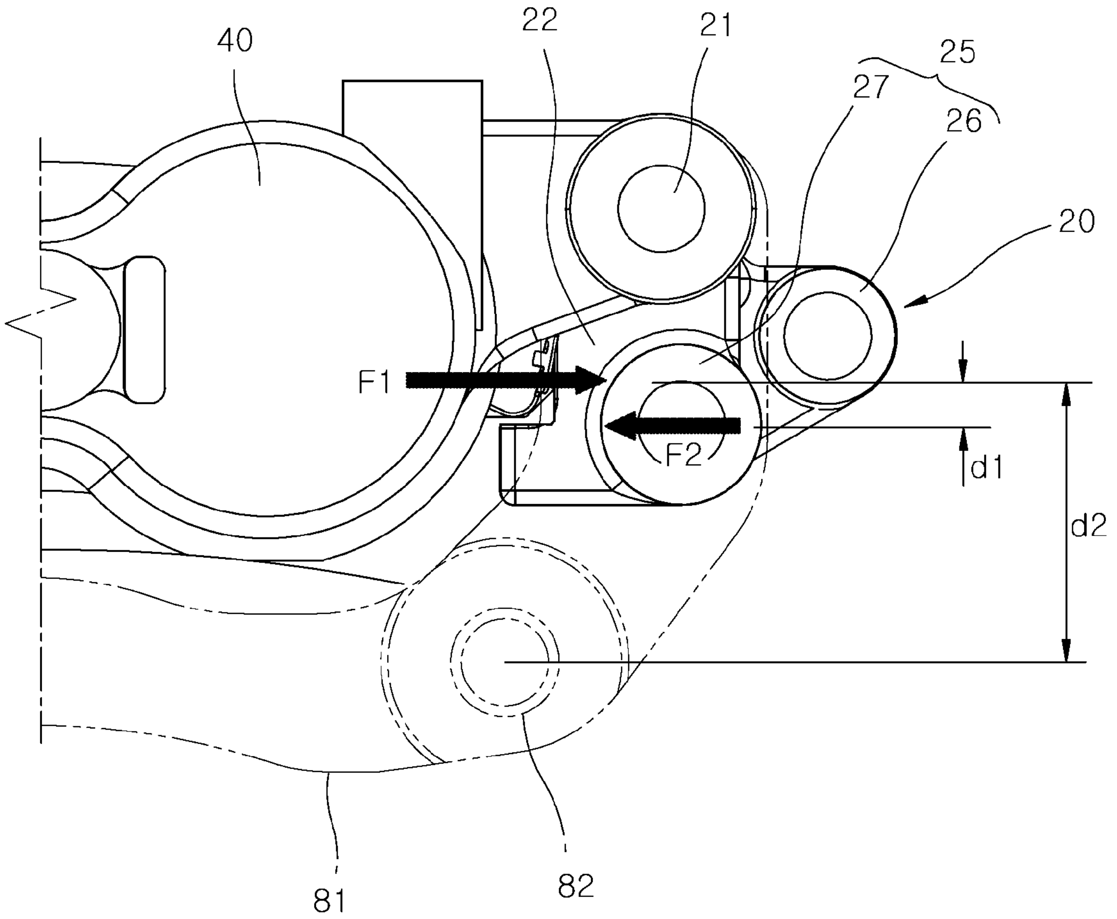
FIG. 15 is a conceptual view for describing a reduction in load applied to a fixed part of a torque member when the disk brake apparatus of the in-wheel driving system in accordance with the embodiment of the present disclosure is applied.

FIG. 14 is a conceptual view for describing the avoidance of interference with other parts when the disk brake apparatus of the in-wheel driving system in accordance with the present disclosure is applied, and FIG. 15 is a conceptual view for describing a reduction in load applied to a fixed part of the torque member when the disk brake apparatus of the in-wheel driving system in accordance with the present disclosure is applied.

In the related art, a torque member (partially illustrated) of a caliper has a structure in which left and right side portions thereof are integrated with a lower portion (hereafter, referred to as 'main beam 81'), when seen from the front. Thus, the torque member has a U-shape as a whole. More specifically, the main beam 81 has a shape extended in the side-to-side direction, and is fastened to the knuckle 6 at two places corresponding to the left and right side portions thereof. The left and right side portions of the torque member are connected as one body to the main beam 81 by a tie bar (not illustrated) which is disposed in parallel at the rear thereof.

When an in-wheel driving system is applied, the rotor 11 and the stator 12 are additionally mounted inside the wheel 2, compared to a structure in which the in-wheel driving system is not applied. Thus, the internal space of the wheel 2 may be further reduced, and the position of the caliper is also moved toward the rotation center C by the thicknesses of the rotor 11 and the stator 12.

Therefore, when the conventional caliper is applied to the in-wheel driving system, the positions of the tie bar and the main beam 81 of the torque member are moved toward the rotation center C, and the tie bar and the main beam 81 of the torque member inevitably interfere with other parts (e.g. the hub bearing 5) which had been arranged inside the wheel 2 in the related art. In addition, since the internal space of the wheel 2 is further reduced, it is difficult to avoid the interference between parts, thereby increasing the burden of the design.

Furthermore, when the conventional caliper structure is applied to the in-wheel driving system, the caliper is fitted onto the circumference of the wheel disk 4, provisionally assembled into the in-wheel driving device 10 so as not to be fixed, and then assembled to the wheel 2 and the knuckle 6. Hereafter, a module obtained by assembling or provisionally assembling the in-wheel driving device 10 and the caliper and the wheel disk 4 will be referred to as 'in-wheel module'.

Thus, when the in-wheel module is transferred, a separate attention is required to prevent the separation of the caliper. Furthermore, when the torque member is fastened to the knuckle 6, an inconvenient process of adjusting and aligning the position of the torque member, which is provisionally arranged and not fixed, with the knuckle 6 needs to be performed.

The disk brake apparatus 1 in accordance with the present disclosure has a structure in which the brake pad 3 is supported by two torque members corresponding to the first and second torque members 20 and 30. That is, the disk brake apparatus 1 has a structure in which the main beam 81 and the tie bar are omitted, compared to the conventional torque member. Furthermore, the first and second torque member 20 and 30 can be coupled and fixed to the stator 12, not the knuckle 6, compared to the conventional torque member.

Thus, the disk brake apparatus 1 in accordance with the present disclosure can avoid the interference with other parts arranged in the central portion of the in-wheel module because it is unnecessary to consider the fastening of the in-wheel module to the knuckle 6, compared to the conventional structure in which the in-wheel module is fastened to the knuckle 6 by the main beam 81. Thus, the disk brake apparatus 1 can further improve the degree of freedom in designing the central portion of the in-wheel module. Furthermore, it is possible to remove a lack in layout, which may occur as the internal space of the wheel 2 is further reduced.

Furthermore, since the in-wheel module is assembled to the wheel 2 and the knuckle 6 with the first and second torque members 20 and 30 installed and fixed onto the stator 12, the disk brake apparatus 1 in accordance with the present disclosure may remove the problem in which the caliper is not fixed but left when the in-wheel module is assembled, thereby further improving the assembling performance and productivity.

Furthermore, in the disk brake apparatus 1 in accordance with the present disclosure, the portion of the torque member, corresponding to the main beam 81 and the tie bar which occupy ⅔ or more of the weight of the torque member, may be removed, compared to the conventional torque member which is fastened to the knuckle 6 by the main beam 81. Thus, the weight of the disk brake apparatus 1 can be significantly reduced, which makes it possible to reduce the cost.

Referring to FIG. 15, the conventional torque member has a distance d2 to a knuckle fastening part 82 fastened to the knuckle 6, with respect to the pad support part 22 to which a load from the brake pad 3 is transferred, and the first torque member 20 in accordance with the present disclosure has a distance d1 (<d2) to the stator coupling part 25. At this time, a tangential or circumferential load F1 is applied to the pad support pad 22, and a load F2 is applied to the stator coupling part 25.

Stress applied to the torque member during braking is affected by the radial distance d1 or d2 between the portion of the torque member, which supports the braking force of the brake pad 3, and the portion onto which the torque member is installed and fixed. As the distance is reduced, a moment generated for the same braking force decreases to reduce internal stress applied to the torque member.

Therefore, the disk brake apparatus 1 in accordance with the present disclosure may further shorten the radial distance between the portion (corresponding to the pad support art 22) which supports the braking force of the brake pad 3 and the portion (corresponding to the stator coupling part 25) onto which the brake pad 3 is installed and fixed, compared to the conventional torque member fastened to the knuckle 6 by the main beam 81. Thus, the internal stress applied to the torque member may be further reduced.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A disk brake apparatus of an in-wheel driving system, comprising:

an in-wheel driving device positioned within a wheel and having a rotor and a stator positioned inside the rotor;

a first torque member having a stator coupling part, the stator coupling part being fixed directly to the stator by a first fastening member, and configured to support first side portions of a pair of brake pads;

a second torque member having another stator coupling part, the another stator coupling part of the second torque member being fixed directly to the stator by a second fastening member, and configured to support second side portions of the brake pads; and a caliper body having a first side portion coupled to the first torque member and a second side portion coupled to the second torque member, and being configured to press the pair of brake pads toward a wheel disk.

2. The disk brake apparatus of claim 1, wherein the first torque member comprises:

a caliper body coupling part coupled to the caliper body; and a pad support part connected to the caliper body and adjoining the brake pad;

wherein the stator coupling part is connected to the caliper body coupling part or the pad support part and coupled to the stator.

3. The disk brake apparatus of claim 2, wherein the caliper body coupling part has a hole or a groove structure at which a guide pin is located, the guide pin being configured to movably support the caliper body in an axial direction of the guide pin.

4. The disk brake apparatus of claim 2, wherein the pad support part comprises:

a first pad support part connected to a first side portion of the caliper body coupling part and configured to support a first brake pad of the pair of brake pads; and a second pad support part connected to a second side portion of the caliper body coupling part and configured to support a second brake pad of the pair of brake pads.

5. The disk brake apparatus of claim 2, wherein the stator coupling part comprises:

a first stator coupling part coupled to a first side portion of the stator; and a second stator coupling part spaced apart from the first stator coupling part and coupled to a second side portion of the stator.

6. The disk brake apparatus of claim 5, wherein the pad support part comprises:

a first pad support part connected to a first side portion of the caliper body coupling part and configured to support a first brake pad of the pair of brake pads; and a second pad support part connected to a second side portion of the caliper body coupling part and configured to support a second brake pad of the pair of brake pads, wherein the first stator coupling part is connected to the first pad support part, and the second stator coupling part is coupled to the second pad support part.

7. The disk brake apparatus of claim 6, wherein the first stator coupling part has a first axis spaced apart from a second axis of the second stator coupling part.

8. The disk brake apparatus of claim 6, wherein the first and second stator coupling parts are coaxial.

9. The disk brake apparatus of claim 6, wherein the first and second stator coupling parts are coupled to one of the first and second pad support parts.

10. The disk brake apparatus of claim 1, wherein the first and second torque members are symmetrically with respect to the pair of brake pads and the caliper body.

11. The disk brake apparatus of claim 1, wherein the stator comprises:

a stator body part positioned within the rotor; and a torque member coupling part positioned on the stator body part and coupled to the first torque member.

12. The disk brake apparatus of claim 11, wherein the torque member coupling part comprises:

a first torque member coupling part positioned at a first side portion of the stator body part and coupled to the first torque member; and a second torque member coupling part positioned at a second side portion of the stator body part, spaced apart from the first torque member coupling part, and coupled to the second torque member.

13. The disk brake apparatus of claim 11, wherein the torque member coupling part comprises:

a protrusion part formed on an inner diameter portion of the stator body part; and a fastening part formed on the protrusion part, and wherein the first fastening member is configured to connect the first torque member to the protrusion part by being fastened to the fastening part.

14. The disk brake apparatus of claim 1, wherein the second torque member comprises:

a caliper body coupling part coupled to the caliper body; and a pad support part connected to the caliper body and adjoining the brake pad;

wherein the another stator coupling part is connected to the caliper body coupling part or the pad support part and coupled to the stator.

15. A disk brake apparatus of an in-wheel driving system, comprising:

an in-wheel driving device having a rotor and a stator and being positioned within a wheel;

a first torque member positioned on the stator and configured to support first side portions of a pair of brake pads;

a second torque member spaced apart from the first torque member and configured to support second side portions of the brake pads; and a caliper body having a first side portion coupled to the first torque member and a second side portion coupled to the second torque member, and being configured to press the pair of brake pads toward a wheel disk, wherein:

the stator comprises:

a stator body part positioned within the rotor;

a torque member coupling part positioned on the stator body part and coupled to the first torque member; and a bracket having a first side portion fixed to the stator body part and a second side portion spaced apart from the torque member coupling part and coupled to the first torque member.

* * * * *